(No Model.)
E. ROAT.
APPARATUS FOR WASHING STARCH.
No. 254,157. Patented Feb. 28, 1882.
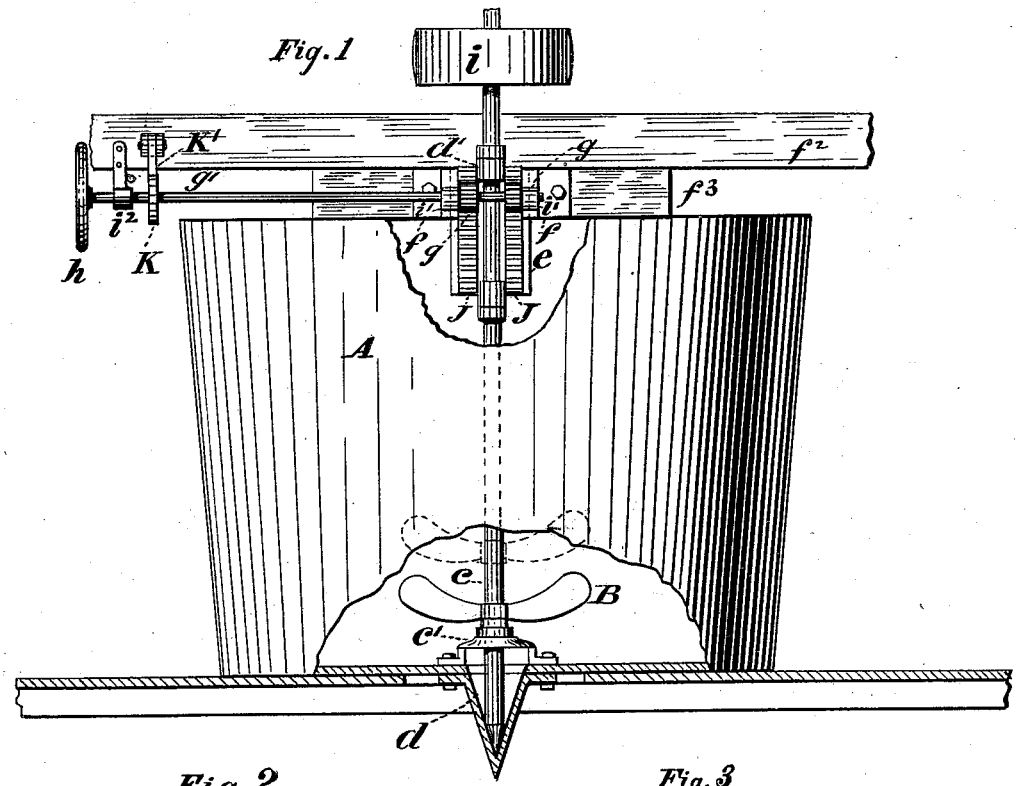
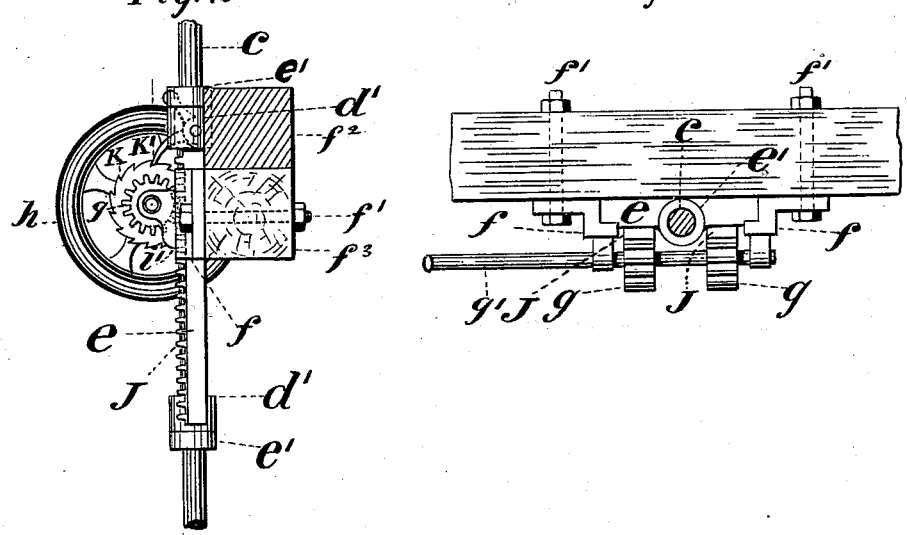
Witnesses.
D. R. Morss
Otto Hoddick
Inventor
Edwin Roat
By W. F. Miller
Atty

UNITED STATES PATENT OFFICE.

EDWIN ROAT, OF BUFFALO, NEW YORK, ASSIGNOR OF ONE-HALF TO HARRY HAMLIN, OF SAME PLACE.

APPARATUS FOR WASHING STARCH.

SPECIFICATION forming part of Letters Patent No. 254,157, dated February 28, 1882.

Application filed December 14, 1881. (No model.)

*To all whom it may concern:*

Be it known that I, EDWIN ROAT, a citizen of the United States, residing at Buffalo, in the county of Erie and State of New York, have invented certain new and useful Improvements in Apparatus for Washing Starch; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to machinery for washing starch; and it consists of a suitable tank and a vertically-adjustable screw-propeller wheel or other agitating device, which may be easily moved up or down to any desired point and fastened, if required, without interfering with the rotary movement of the agitator.

My invention further consists in certain details of construction, all of which will be more clearly hereinafter shown by reference to the drawings, in which—

Figure 1 is a front elevation of the device complete, showing a portion of the top and bottom broken away, so as to expose the agitating-wheel and the vertically-adjusting device. Fig. 2 is a detached side elevation of the vertically-adjusting mechanism, and Fig. 3 is a top view of the same.

Starch, when allowed to settle to the lower part of the tank in which it is placed and mingled with water, soon becomes comparatively solid, so that if the agitating device is immersed or partly immersed in it considerable power would be required to move it.

The object of my invention is to obviate this objection by having the agitating device adapted to be readily adjusted vertically and secured at any point of such adjustment, or be allowed to gradually descend when required, and so that the agitating-wheel may be easily adapted to different quantities of material that may be put into the tank.

A represents a tank or other suitable vessel for holding the starch, which is mixed with water, so as to appear like a white or milky fluid, in which state it is pumped or otherwise conducted into the tank or washer, where it is thoroughly agitated. The starch is then allowed to settle, and becomes comparatively solid, as before mentioned. The water remaining above it, containing impurities, &c., is then allowed to run off and fresh water is put in its place. The agitating-wheel is now released from the device which holds it to its vertical position, thereby allowing it to gradually descend into the starch while agitating and thoroughly mixing it up with the water. This operation is repeated until the starch is washed sufficiently clean.

B is the agitating wheel or screw. It is keyed or otherwise secured in any well-known way to the vertical shaft $c$, which shaft passes through a supporting box or step, $c'$, and is capable of a vertical movement therein. The bottom of the tank is provided with a conical or other shaped recess, $d$, into which the lower end of the shaft $c$ passes as it is moved up or down, and at the bottom of which it rests when at the limit of its downward movement. The upper part of the shaft $c$ passes through the projecting parts $d'$ on the rack-plate $e$, and is provided with collars $e'$, fastened thereto in any well-known way, so as to keep it in a vertical position to the plate $e$, and at the same time be allowed to rotate freely. The rack-plate is fitted in guideways $ff$, which are secured to the beam $f^3$ by bolts $f'$, so that it has a free up-and-down movement, and it receives such movement by means of the pinions $g$ $g$, shaft $g'$, and hand-wheel $h$, or a crank or other well-known means for turning it. The vertical shaft $c$ receives a rotary movement from a belt and a pulley, $i$; but a cable or any other well-known arrangement of gearing may be used for giving the required movement. The shaft $g'$ is supported in bearings $i'$ on the guideways $ff$, so as to keep the pinions $g$ in gear with the racks J on the rack-plate. It is also further supported by a bearing, $i^2$. When the screw or agitating wheel B is adjusted to the vertical point desired it is prevented from moving down, when required, by the ratchet-wheel K and pawl K', thereby holding it securely to any point to which it may be adjusted. It will now be seen that by turning the hand-wheel $h$, and consequently the shaft $g'$ and pinions g g, the rack-plate e, the vertical rotating shaft c, and the agitating-wheel B may be moved either up or down and fastened at any vertical point desired without in any way interfering with the rotary motion of said shaft or the agitating-wheel.

I have shown an ordinary screw-wheel as the agitating device, but any other shaped wheel or arms attached to the shaft c, or any other well-known means adapted to the purpose may be used. In practice I find the ordinary propeller-wheel answers the purpose well.

In place of the racks and pinions on the rack-plate e, a screw may be used to give the required vertical movements.

I claim—

1. A starch tank or vessel provided with a step or supporting-box, c', and a recess, d, in combination with a rotating shaft having an agitating device, and made vertically adjustable by means substantially as described.

2. A starch-tank having a shaft, c, collars c', and a rack-plate, e, having racks J, and projecting parts d' adapted to receive said shaft, in combination with the pinions g and shaft g', provided with a hand-wheel, h, and a ratchet-wheel and pawl K K', substantially as and for the purposes described.

EDWIN ROAT.

Witnesses:
OTTO HODDICK,
W. T. MILLER.